United States Patent [19]
Hara

[11] Patent Number: 5,157,696
[45] Date of Patent: Oct. 20, 1992

[54] DIGITAL SIGNAL TIME DIFFERENCE CORRECTING CIRCUIT

[76] Inventor: Kojiro Hara, 5-13-15, Haruecho, Edogawa-ku, Tokyo, Japan, 134

[21] Appl. No.: 643,521

[22] Filed: Jan. 18, 1991

[30] Foreign Application Priority Data

Jan. 19, 1990 [JP] Japan ..................... 2-10298

[51] Int. Cl.⁵ ............................... H04L 7/00
[52] U.S. Cl. .................... 375/100; 328/155; 371/1; 375/118
[58] Field of Search ........... 360/22, 26, 51; 371/1; 328/55, 155; 307/590; 375/38, 118; 365/189.01, 189.04, 78, 221; 369/60; 377/78, 104

[56] References Cited

U.S. PATENT DOCUMENTS

| | | | |
|---|---|---|---|
| 4,357,702 | 11/1982 | Chase et al. | 360/26 |
| 4,433,394 | 2/1984 | Torii et al. | 365/221 |
| 4,803,566 | 2/1989 | Berlekamp et al. | 360/26 |

*Primary Examiner*—Benedict V. Safourek
*Attorney, Agent, or Firm*—Knobbe, Martens, Olson & Bear

[57] ABSTRACT

A digital signal time difference correcting circuit used in digital interface circuits for transmitting and receiving a plurality of digital signals. Prior art digital interface circuits in typical tape recorders process signals on two channels using a single cable. Where the number of channels increases to more than two, a plurality of cables need to be used correspondingly. If the cables are different in length or if any cable has a data processing circuit or the like therein, the signals on the cables are out of phase with one another and cannot be processed. The circuit according to the invention comprises a plurality of pairs of storage means relative to a plurality of input signals and a control means. The control means writes each of the digital input signals to either of two storage means constituting each pair thereof. The control means reads data simultaneously from both storage means constituting each storage means pair in accordance with the clock timing of either of the input signals stored therein. This scheme eliminates the time difference of the multiple digital input signals.

7 Claims, 4 Drawing Sheets

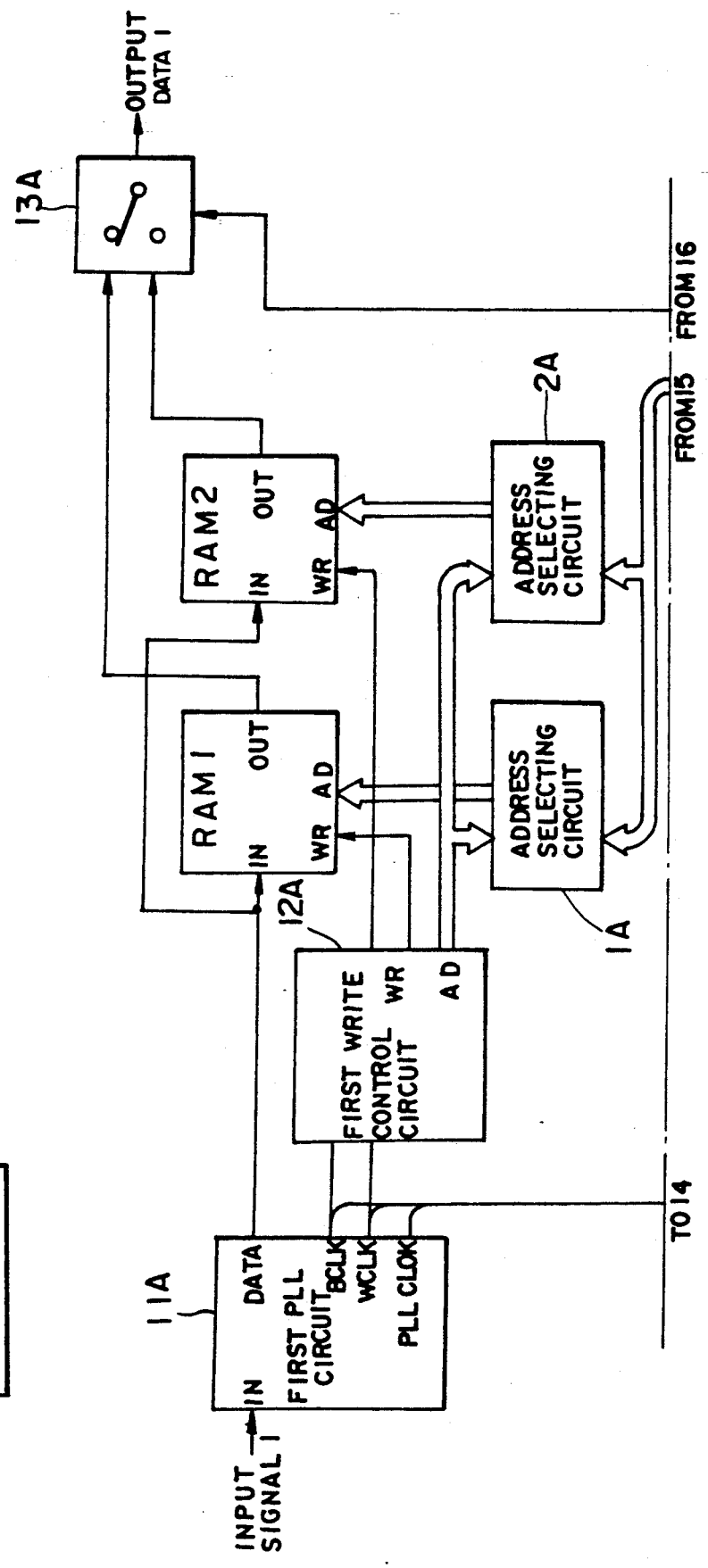

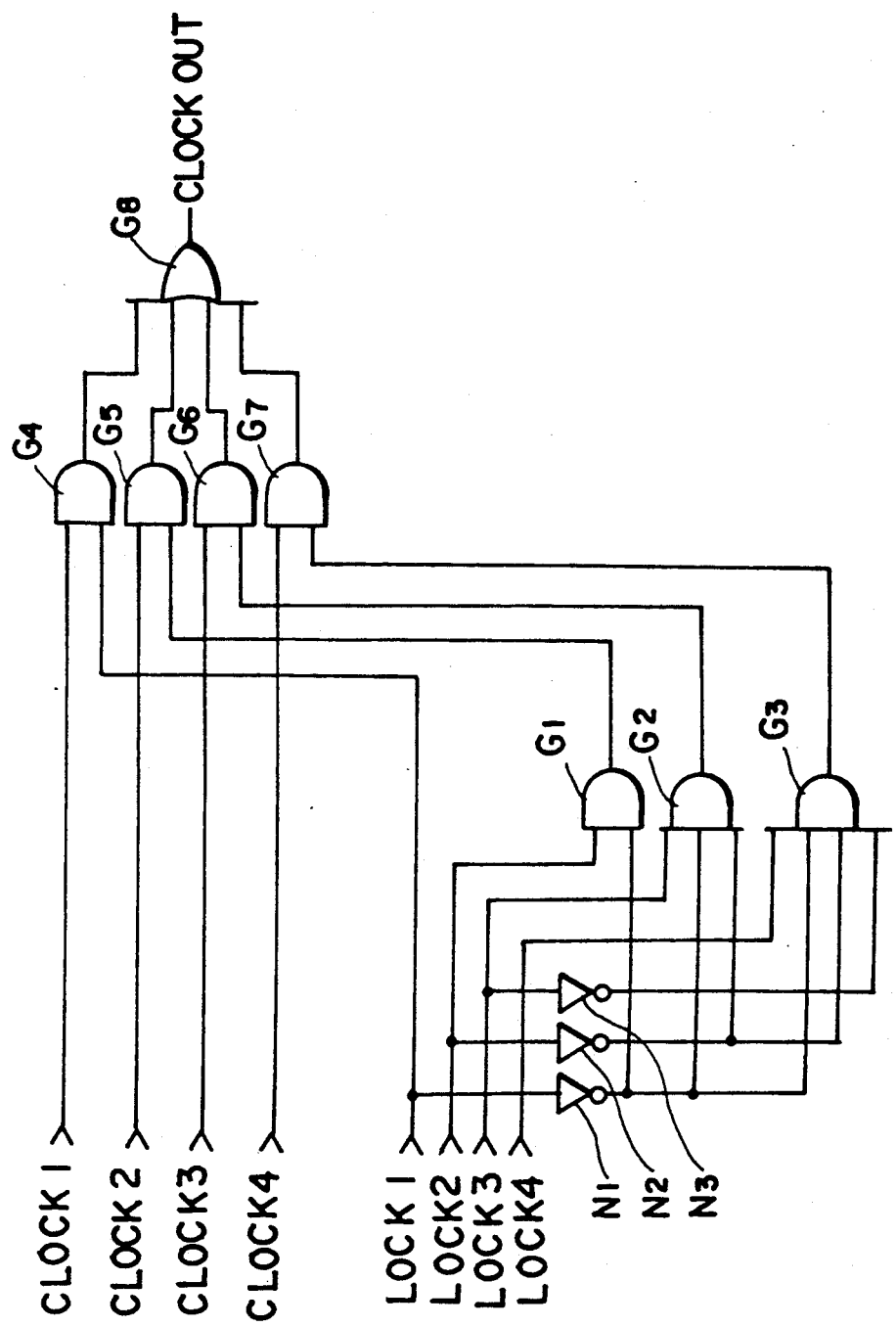

DIGITAL SIGNAL TIME DIFFERENCE CORRECTING CIRCUIT

BACKGROUND OF THE INVENTION

1. Field of the Invention

The present invention relates to a digital signal time difference correcting circuit for use with digital interface circuits for transmitting and receiving a plurality of digital signals.

2. Description of the Prior Art

Prior art digital interface circuits in typical tape recorders perform signal processing on two channels using a single cable. Where the number of channels increases to four, eight, 32 and so on, a plurality of cables need to be used correspondingly. One disadvantage of this prior art setup is as follows: If the cables are different in length or if the cables have the same length but include data processing circuits or the like therein, signals having the identical time sequence may be changed in phase depending on the length of the cables or time delays of the data processing circuits (i.e., occurrence of time difference). In such a case, the signals cannot be transferred practically over the cables.

The trouble is that there has been no solution to the above impediment so far.

SUMMARY OF THE INVENTION

It is therefore an object of the present invention to overcome the above-described drawbacks and disadvantages and to provide a digital signal time difference correcting circuit that corrects the time difference of a plurality of digital input signals of which the time sequence is the same and of which the phases are different from one another, so as to transfer all digital input signals in phase. In achieving the foregoing and other objects of the present invention and according to one aspect thereof, there is provided a digital signal time difference correcting circuit for correcting the time difference of a plurality of digital input signals of which the time sequence is the same and of which the phases are different from one another, the circuit comprising a plurality of pairs of storage means relative to the plurality of input signals, a control means phase lock loop writing each of the digital input signals to one of two storage means constituting each storage means pair, the other storage means having each signal previously written therein, the control means reading data simultaneously from the two storage means constituting each storage means pair in accordance with the clock timing of either of the input signals stored therein.

According to another aspect of the invention, there is provided a digital signal time difference correcting circuit wherein the above-mentioned digital input signals are locked after passing through PLL (phase lock loop) circuits and the clock timing for reading data is furnished by one of the locked signals.

BRIEF DESCRIPTION OF THE DRAWINGS

FIGS. 1A and 1B are block diagrams of a digital signal time difference correcting circuit embodying the present invention;

FIG. 3 is a circuit diagram of a clock selecting circuit for use with a variation of the embodiment.

DESCRIPTION OF THE PREFERRED EMBODIMENT

A preferred embodiment of the present invention will now be described with reference to the accompanying drawings.

Figure 1B:
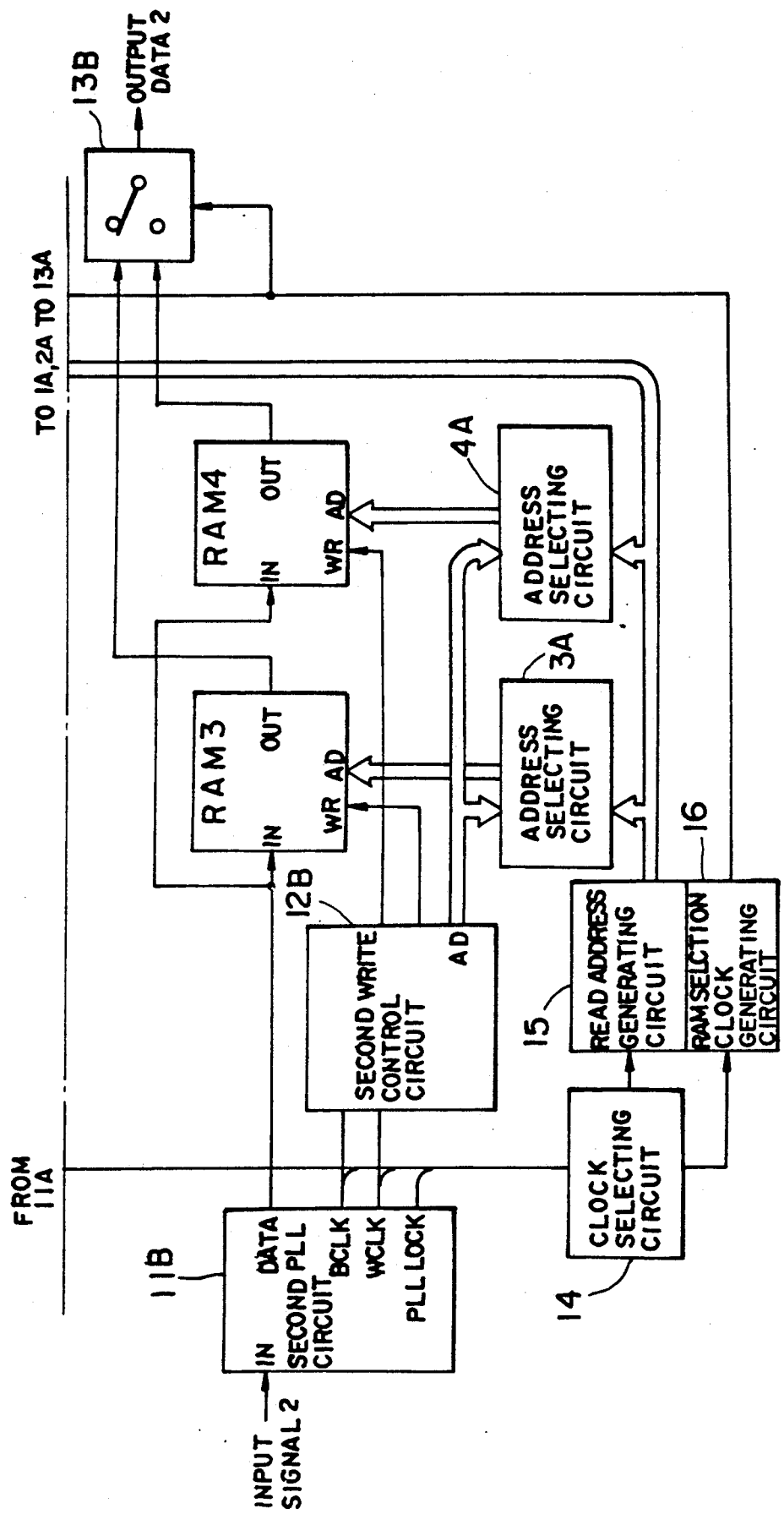

FIG. 1 is a block diagram of a digital signal time difference correcting circuit embodying the invention. In FIG. 1, a first PLL (phase lock loop) circuit 11A admits a first digital input signal (hereinafter referred to as "first input signal") 1 via an input terminal IN, and a second PLL circuit 11B admits an input signal 2 via the input terminal IN.

The two PLL circuits demodulate clock signals contained in the input signals. A first write control circuit 12A generates a write timing and an address based on the clock signal from the first PLL circuit 11A. A second write control circuit 12B generates a write timing and an address based on the clock signal from the second PLL circuit 11B. A RAM 1 and a RAM 2 constitute a pair of storage means located in the processing path of the first input signal 1. A RAM 3 and a RAM 4 are a pair of storage means located in the processing path of the second input signal 2. The RAM 1 and RAM 2 are addressed by address selecting circuits 1A and 2A, respectively. The RAM 3 and RAM 4 are addressed by address selecting circuits 3A and 4A, respectively. A clock selecting circuit 14 admits clock signals and locked signals from the PLL circuits 11A and 11B, and selects the clock signal from one of the two circuits. An address generating circuit 15 generates a read address based on the clock signal selected by the clock selecting circuit 14, and supplies the read address to each of the address selecting circuits 1A, 2A, 3A and 4A. A RAM selection clock generating circuit 16 generates a signal for determining which of the RAMs are to be selected based on the output from the clock selecting circuit 14. Data selectors 13A and 13B select the output from either the pair of RAM 1 and RAM 2 or the pair of RAM 3 and RAM 4 in accordance with the signal from the RAM selection clock generating circuit 16.

How the embodiment of the above configuration works will now be described with reference to the timing chart of FIG. 2.

Figure 2:
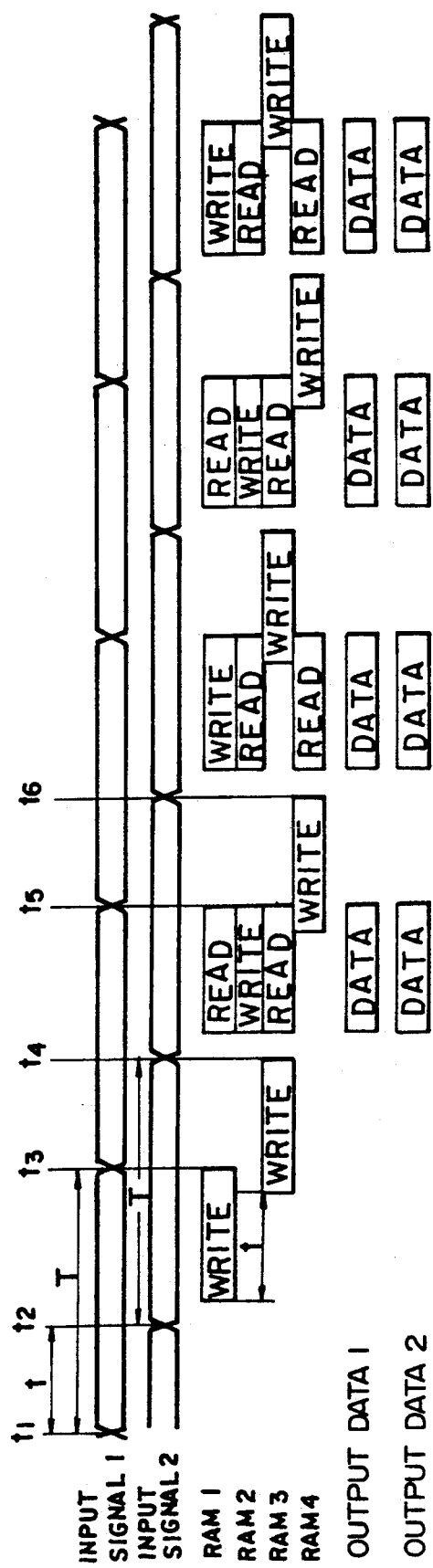
FIG. 2 is a timing chart for describing how the embodiment works.

As depicted in FIG. 2, it is assumed that a time sequence T is the same for the input signals 1 and 2 and that a time difference "t" exists between the signals (i.e., interval between time $t_1$ and time $t_2$). The PLL circuits 11A and 11B output the clock timing signal of each input signal to the write control circuits 12A and 12B, respectively. In turn, the write control circuits 12A and 12B write data to either of the pair of RAMs in the output path thereof. A case is assumed in which the RAM 1 is selected for the input signal 1 and the RAM 3 is selected for the input signal 2. In that case, the data of the first input signal 1 is written to the RAM 1 between time $t_2$ and time $t_3$. Upon elapse of the time difference "t", the data of the second input signal 2 is written to the RAM 3. During a time sequence immediately after the writing of the data of both input signals 1 and 2, the previously written data is read out as follows:

The clock selecting circuit 14 selects the clock signal of either the PLL circuit 11A or the PLL circuit 11B. The clock selecting circuit 14 then outputs the clock signal to the address generating circuit 15 and RAM selection clock generating circuit 16. As will be described later in more detail, given a plurality of channels carrying a plurality of input signals, the clock selecting circuit 14 outputs any one of clock signals which is phase-locked, for example, the clock signal from the lowest channel number. If the input signals 1 and 2 both exist, the clock signal from the first PLL circuit 11A is selected by the clock selecting circuit 14. Using the clock timing of the selected clock signal, the address generating circuit 15 selects the read address for each RAM. In turn, the data selectors 13A and 13B select and transfer the output of the RAM 1 and RAM 3 out of the two pairs of RAMs by use of the control signal from the RAM selection clock generating circuit 16, the selected RAMs having the data previously written therein. Because the data is read simultaneously from the RAM 1 and RAM 3 containing the input signals 1 and 2 respectively, the two signals stay in phase with each other. While the data is being read from the RAM 1 and RAM 3 (i.e., between time $t_4$ and time$_5$), the input signal 1 is written to the other RAM 2. To the RAM 4, from which the data is not read, the input signal 2 is written upon elapse of the time difference "t" since the time of data writing to the RAM 2.

Thereafter, data is read simultaneously from the RAM 2 and RAM 4 at the next time sequence to the one at which the data was written thereto (i.e., after time $t_6$). At this point, the data of the input signal 1 relative to the next time sequence is written to the RAM 1. Upon elapse of the time difference "t", the data of the input signal 2 with the next time sequence is written to the RAM 3.

In this manner, one of each pair of RAMs is used to write data thereto and the other is used to read data therefrom at one time sequence, and the read and write operation in the RAMs is reversed in the next time sequence. This means that there is little wait time between read and write operations, so that data processing is carried out faster than ever before.

The above-described embodiment is not intended to be limitative of the present invention, and there may be many variations thereof.

For example, the above embodiment involves handling two input signals (e.g., on two channels). After the signals are clock-demodulated by the PLL circuits, the clock timing of the input signal 1 (i.e., the signal with the lower channel number of the two) is selected and a read clock signal is generated accordingly. The same operating principle may be applied to alternative cases where more input signals are to be handled. In such cases, the clock selecting circuit is modified as needed.

FIG. 3 is a circuit diagram of a clock selecting circuit for use in another embodiment of the present invention having four input signals. Needless to say, where four input signals (e.g., on four channels) are to be handled, it is necessary to provide four pairs of storage means, four write control circuits and four data selectors.

In FIG. 3, a gate circuit $G_1$ is an AND gate circuit having two inputs, i.e., a second locked signal LOCK 2 and the inverted signal of a first locked signal LOCK 1 (obtained through a NOT gate $N_1$). A gate circuit $G_2$ is an AND gate circuit having three inputs, i.e., a third locked signal LOCK 3 and the inverted signals of the first and second locked signals (obtained through NOT gates $N_1$ and $N_2$). A gate circuit $G_3$ is an AND gate circuit having four inputs, i.e., a fourth locked signal LOCK 4 and the inverted signals of the first through third locked signals (obtained through NOTE gates $N_1$, $N_2$ and $N_3$). A gate circuit $G_4$ is an AND gate circuit having two inputs, i.e., a first clock signal CLOCK 1 and the locked signal LOCK 1. A gate circuit $G_5$ is an AND gate circuit having two inputs, i.e., a second clock signal CLOCK 2 and the output of the AND gate $G_1$. A gate circuit $G_6$ is an AND gate circuit having two inputs, i.e., a third clock signal CLOCK 3 and the output of the AND gate circuit $G_2$. A gate circuit $G_7$ is an AND gate circuit having two inputs, i.e., a fourth clock signal CLOCK 4 and the output of the AND gate $G_3$. A gate circuit $G_8$ is an OR gate circuit that admits the outputs of the AND gates $G_4$ through $G_7$.

In the above-described circuit arrangement, one of the phase locked clocks, for example, the clock timing of the signal with the lowest number on any line brought High is selected as the read clock timing, the selected signal being among the signals LOCK 1 through LOCK 4 indicating the locked state of each PLL circuit. If any of the four input signals is not locked, the other locked signals are available for use. This ensures reliable operations of the circuit.

As described, the digital signal time difference correcting circuit according to the invention transfers data in phase by correcting the time difference of a plurality of signals which have the same time sequence but which differ in phase from one another. Because one of the multiple input signals is selected and the clock signal thereof is used to provide the read clock timing, circuit operations remain reliable regardless of the change of timing in any signal. If there occurs a signal line that is not locked where PLL circuits are used for clock demodulation, only the signal of a locked line is used as the read signal. This eliminates the possibility of erroneous or failed operations ever taking place.

What is claimed is:

1. A digital signal time difference correcting circuit for correcting the time difference of a plurality of channels of digital input signals having the same time sequence but different phases from one another, comprising:

a pair of memories relative to each channel of said plurality of channels of said digital input signals;

a clock detection circuit relative to each channel for detecting a clock signal from said digital input signals;

a clock selection circuit for selecting a clock signal from one of said clock signals detected by said clock detection circuits;

a write control circuit relative to each channel for controlling the write timing of said pair of memories based on the clock signal from said clock detection circuit corresponding to said channel associated with said pair of memories, said write control circuit controls said memories so that the data in a first time sequence is written in one memory of said pair of memories while the data in the next time sequence is written in the other memory of said pair of memories;

an address generating circuit for generating a read address signal of the same timing for said plurality of pairs of memories with respect to said plurality of channels based on the clock signal from said clock selection circuit; and a data selector for selecting data from said pair of memories with respect to each of said channels.

2. A digital signal time difference correcting circuit as defined in claim 1, wherein said clock detecting circuit for each channel is comprised of a phase lock loop, one of phase lock signals from said plurality of channels is used for generating said address signal for reading out said data.

3. A digital signal time difference correcting circuit as defined in claim 2, wherein said address signal for reading out said data is generated based on the clock signal on the channel having the lowest channel number.

4. A digital signal time difference correcting circuit for correcting the time difference of a plurality of channels of digital input signals having the same time sequence but different phases from one another, the circuit comprising:

a first channel correction circuit, comprising:
  a pair of memories for alternatingly receiving data on said channel according to a first clock signal in a first channel time sequence established for said channel;
  a controller for alternatingly controlling the write timing of each of said memories such that data within said first time sequence is written into a first memory of said pair of memories, and data within a second time sequence is written into a second memory of said pair; a second channel correction circuit, comprising:
  a pair of memories for alternatingly receiving data on said second channel according to a clock signal in a second channel time sequence established for said channel which is out of phase with said first channel time sequence; and
  a controller for alternatingly controlling the write timing of each of said memories of said second channel such that data in a first time sequence is written into a third memory and data from a second time sequence is written into a fourth memory, said third and fourth memories comprising said pair of memories associated with said second channel; and a controller for controlling the read timing of both of said channels in accordance with either said first clock signal or said second clock signal such that data from said first and third memories is read simultaneously or data from said second and fourth memories is read simultaneously, whereby the time difference between said first and second channels is corrected.

5. The digital signal time difference correcting circuit of claim 4, further comprising a data selector associated with each of said channels for alternatingly controlling the read timing of said pair of memories associated with said channel such that data in the first memory of said pair is read and then data in the second memory of said pair is read, the function of each of said data selectors being controlled in turn by said controller.

6. The digital signal time difference correcting circuit of claim 4, further comprising a plurality of channels constructed in accordance with said first and second channels.

7. A method for correcting the digital signal time difference of a plurality of channels, each receiving digital input signals, comprising the steps of:
  a. providing at least two memories for each channel;
  b. writing data from said digital input signals alternatingly into a pair of memories of a first channel in accordance with a first time sequence;
  c. writing data from said digital input signals alternatingly into a pair of memories of a second channel in accordance with a second time sequence which is out of phase with respect to said first time sequence; and
  d. reading simultaneously the data from said memories of each of said channels in accordance with either said first time sequence or said second time sequence, whereby the difference in said first and second time sequence is corrected.

* * * * *